UNITED STATES PATENT OFFICE.

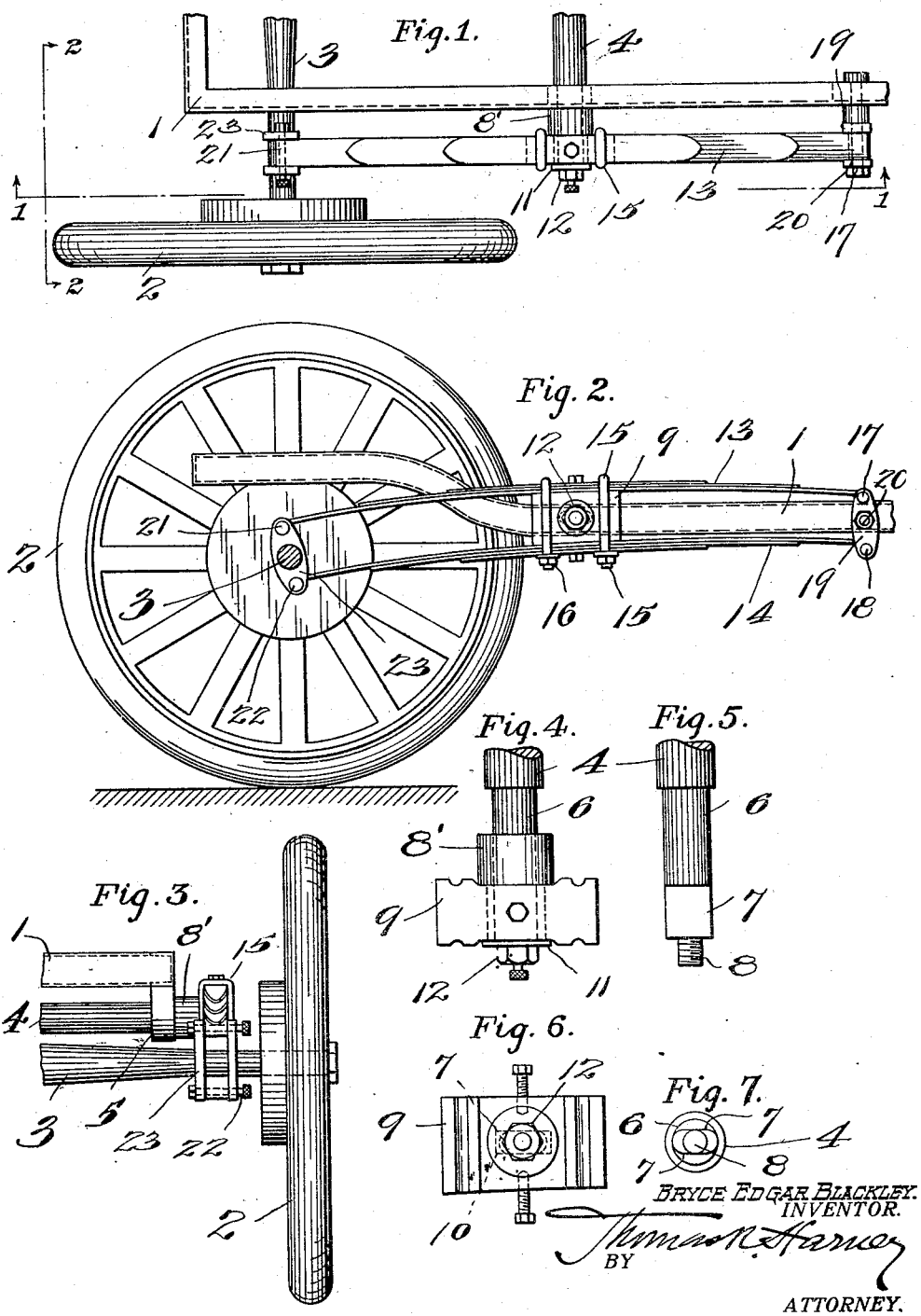

BRYCE E. BLACKLEY, OF PROVIDENCE, RHODE ISLAND.

VEHICLE-SPRING.

1,211,816. Specification of Letters Patent. Patented Jan. 9, 1917.

Application filed October 14, 1915. Serial No. 55,898.

*To all whom it may concern:*

Be it known that I, BRYCE E. BLACKLEY, a citizen of the United States of America, residing at Providence, in the county of Providence and State of Rhode Island, have invented certain new and useful Improvements in Vehicle-Springs, of which the following is a specification.

The present invention appertains to an improved vehicle spring adapted for use especially in connection with automobiles, as a shock absorbing device, to equalize and distribute the movement of the frame of the vehicle by flexibly suspending the latter above the axle of the vehicle.

The primary object of the invention is the provision of a supporting spring which shall be at once of the minimum lightness and maximum strength, but of proper flexibility to perform its functions in an efficient manner.

The invention consists in the novel combination and arrangements of parts as will be hereinafter more specifically set forth and as illustrated in the accompanying drawings wherein I have embodied the invention according to the best mode I have so far devised for the practical application of the principles of the invention.

Figure 1 is a plan view of so much of an automobile frame and wheel as are necessary to illustrate the application thereto of my invention. Fig. 2 is a side elevation of Fig. 1 at line 1—1, the axle being shown in section. Fig. 3 is a rear view of Fig. 1 at line 2—2. Fig. 4 is a top plan view, enlarged, of the journal end and journal block of a shaft employed in connection with the equalizing springs. Fig. 5 shows the journal end of the shaft, the block omitted. Fig. 6 is an end view of Fig. 4. Fig. 7 is an end view of Fig. 5.

In the preferred embodiment of my invention as exemplified in the drawings the frame 1, wheel 2, and axle casing 3 are of any usual or suitable type generally employed in the make-up of automobiles, and these parts are merely typical illustrations. In adapting my invention to an automobile or other vehicle I employ a transversely extending shaft 4 which is journaled in bearing blocks 5 and has its end reduced at 6 to form a journal, while at 7, 7, it is formed with flattened portions, and the extreme end 8 is screw threaded as shown. While only one end of the shaft is illustrated, it will of course be understood that both ends are of identical structure.

The journal end of the shaft projects beyond the frame, through which it passes, and a collar 8' is employed on the shaft outside the frame as a spacing member against which the spring block 9 bears. This block is preferably a rectangular metal casting of malleable iron or other suitable material provided with an opening 10 extending transversely therethrough and oblong in shape in order that it may slip neatly over and fit on the flattened portions 7 of the shaft 4, and so that the block may move over the shaft in a direction longitudinally of the frame.

The block is held on the flattened portions 7 by means of the washer 11 and nut 12, and an oil cup is provided for lubricant. The block is held on the shaft against lateral movement, but it will be noted that the slot 10 is of sufficient size to permit longitudinal movement of the block on the shaft. The block is the supporting member for the two leaf springs 13 and 14, attached above and below the block by means of the U-shaped bolts 15 and nuts 16, the bolts straddling the block and springs and securely holding the latter on the former. At their forward ends the springs are pivoted at points 17 and 18 to the shackle 19, and the shackle is pivoted on a stud shaft 20 rigidly secured to the frame 1. The rear ends of the springs are similarly supported at pivotal points 21, 22 of the shackle 23, which is fixed on the axle casing 3. In this manner it will be seen that the frame is flexibly suspended between the three pivotal points, and the full length of the springs is available for absorbing and equalizing shocks that would otherwise be imparted to the frame. It will be noted also that the springs, through the flexible connections and suspension, have dispensed, to a great degree with the arch customarily employed, and the springs are more nearly on a straight horizontal line than the usual springs. This construction of the spring permits the use of a minimum amount of material in the springs and the cross sectional area is consequently reduced.

What I claim is:—

1. The combination with a vehicle frame, axle casing and a supporting member in the frame, of a spring block carried by said member and longitudinally movable relatively to the frame, upper and lower springs attached to the block, a shackle pivotally connecting the forward ends of the springs and pivoted to the frame, and a shackle pivotally connecting the rear ends of the springs and carried on the rear axle casing.

2. The combination with a vehicle frame, axle casing, and supporting shaft, of a leaf spring supported on the shaft and movable longitudinally of the frame relatively to the shaft, and the ends of the spring pivoted respectively to the frame and axle casing, whereby a direct drive is secured throughout the full length of the spring.

3. The combination with a vehicle frame, axle casing and supporting shaft journaled in the frame, of a pair of spaced leaf springs, a slotted block, to which said springs are attached, movable on the shaft longitudinally of the frame, pivotal supports for the springs on the frame at one end, and a member on the axle casing to which the other ends of the springs are pivoted.

In testimony whereof I affix my signature.

BRYCE E. BLACKLEY.

Copies of this patent may be obtained for five cents each, by addressing the "Commissioner of Patents, Washington, D. C."